United States Patent [19]
Aoki

[11] Patent Number: 5,655,419
[45] Date of Patent: Aug. 12, 1997

[54] HANDLE APPARATUS

[75] Inventor: Yasuo Aoki, Yokohama, Japan

[73] Assignee: Nikon Corporation, Tokyo, Japan

[21] Appl. No.: 648,913

[22] Filed: May 16, 1996

[30] Foreign Application Priority Data

May 17, 1995 [JP] Japan ................... 7-118590

[51] Int. Cl.$^6$ ................................ F16H 37/06
[52] U.S. Cl. ................ 74/665 B; 74/10.54; 359/383; 359/384
[58] Field of Search .............. 74/10.52, 10.54, 74/545, 665 B; 359/383, 384, 391, 393, 821

[56] References Cited

U.S. PATENT DOCUMENTS

| | | | |
|---|---|---|---|
| 4,003,628 | 1/1977 | Halperin | 359/383 |
| 4,020,705 | 5/1977 | Hayasaka | 74/10.54 |
| 4,173,902 | 11/1979 | Shio | 74/10.52 |
| 4,616,517 | 10/1986 | Esmay | 359/383 X |
| 4,660,942 | 4/1987 | Hill | 359/383 |
| 4,919,001 | 4/1990 | Ogiwara et al. | 74/10.52 |
| 4,968,118 | 11/1990 | Maki et al. | 359/383 X |
| 5,121,655 | 6/1992 | Toshimitsu | 74/665 B |

*Primary Examiner*—Charles A. Marmor
*Assistant Examiner*—Peter T. Kwon
*Attorney, Agent, or Firm*—Shapiro and Shapiro

[57] ABSTRACT

A handle apparatus has a rough movement handle and a fine movement handle for rotating an output shaft at leastwise two stages of rough and fine movements by rotationally operating these handles. The rough movement handle is constructed as a crank handle. The fine movement handle is provided in a position apart from a rotating center of the crank handle. A medium movement handle may be provided coaxially with the fine movement handle. It is therefore possible to provide the inexpensive handle apparatus capable of increasing a driving torque of the rough movement handle, shifting the fine movement handle to an arbitrary position, making an installation thereof easier and reducing the number of parts required.

13 Claims, 5 Drawing Sheets

HANDLE APPARATUS

BACKGROUND OF THE INVENTION

1. Field of the Invention

The present invention relates to a handle apparatus for rotating an output shaft, which is used suitably for a mechanism for elevating and lowering, e.g., an objective lens and a stage of a microscope.

2. Related Background Art

A known prior art handle apparatus, disclosed in Japanese Patent Application Laid-Open Nos. 52-35656, 52-35657 and 52-53436, is capable of rotating an output shaft by switching the movement at such three stages as a rough movement, a medium movement and a fine movement. An outline of a conventional handle apparatus 200 will be explained with reference to FIG. 5. The following is an example of a construction thereof.

A slider 201 is fitted with a stage or an object lens (neither the stage nor the objective lens is shown) that are elevated and lowered integrally with the slider 201. A fixed support member 202 is inserted into the interior of the slider 201. Provided also is a pinion 204 engaging with a rack 203 formed in a side surface of the support member 202. The slider 201 is elevated and lowered by rotating the pinion 204, thus controlling a height of the unillustrated stage or objective lens. A central shaft 205 penetrating crosswise the slider 201 extends in the interior of the pinion 204. A couple of fine movement handles 206a, 206b, a couple of medium movement handles 207a, 207b and a couple of rough movement handles 208a, 208b are secured in sequence from the outside to ends of the central shaft 205 that protrude respectively in the right and left directions of the slider 201.

A frictional force adjustment ring 209 for controlling a driving torque of each handle is mounted at one side portion (which is a left portion in FIG. 5) of the slider 201. When rotating the frictional force adjustment ring 209 and each handle in such directions that they fasten each other, there must be needed a driving torque enough to rotate each handle. Reversely when rotating the frictional force adjustment ring 209 and each handle in such directions that they slacken each other, a small driving torque may suffice for rotating each handle. If the frictional force adjustment ring 209 is too slackened, however, it may happen that the slider 201 drops down by a self-weight thereof when separating the hand from the handle. It is therefore required that the frictional force adjustment ring 209 be properly fastened.

Further, a speed reduction device 210 for transmitting rotations of the respective handles to the pinion 204 is provided at the other side portion (which is a right side in FIG. 5) of the slider 201. As illustrated in the Figure, the speed reduction device 210 includes a multiplicity of gears. The rotations of each handle are properly decelerated through a gear train of the speed reduction device 210 and then transmitted to the pinion 204. With this operation, for example, the slider 201 is elevated and lowered on the order of several tens millimeters for one rotations of each of the rough movement handles 208a, 208b. The slider 201 is also elevated and lowered on the order of several millimeters for one rotation of each of the medium movement handles 207a, 207b. Then, the slider 201 is elevated and lowered on the order of 1 mm or less for one rotation of each of the fine movement handles 206a, 206b.

SUMMARY OF THE INVENTION

According to the above-mentioned prior art handle apparatus, each couple of rough, medium and fine movement handles are so disposed coaxially with the central shaft as to be superposed at the three stages, and each handle is therefore hard to operate. In particular, when trying to rotate the medium movement handle interposed between the rough movement handle and the fine movement handle, other handles tend to rotate together. Further, since the driving torque of the rough movement handle is large, a diameter of the rough movement handle must increase. Moreover, a position of installing each handle is confined on the central shaft. Especially, the medium movement handle and the fine movement handle are hard to employ because of an impossibility of shifting these handles to arbitrary positions.

Furthermore, when mounting the prior art handle apparatus on the slider, the driving torque must be controlled simultaneously by properly fastening or slackening the frictional force adjustment ring and each handle or by changing a thickness of a washer for adjusting the frictional force each time. Therefore, a skilful technique is required for mounting the handle apparatus, and only the handle can not be easily replaced.

Further, although the prior art handle apparatus can be operated from either side because of the handles being provided on both sides of the slider, each type of one couple of handles are therefore needed, resulting in an increase in the number of parts. This also makes the assembly complicated and the costs harder to reduce.

It is a primary object of the present invention to provide an inexpensive novel handle apparatus with a less number of constructive parts, which is capable of driving a rough movement handle by a small force and exhibiting a high operability.

According to one aspect of the present invention, a handle apparatus comprises a rough movement handle and a fine movement handle for rotating an output shaft at leastwise such two stages as rough and fine movements by rotationally operating these handles. The rough movement handle is constructed as a crank handle. The fine movement handle is provided in a position apart from a rotating center of the crank handle.

According to another aspect of the present invention, a handle apparatus comprises a rough movement handle, a medium movement handle and a fine movement handle for rotating the output shaft at leastwise such three stages as a rough movement, a medium movement and a fine movement by rotationally operating these handles. The rough movement handle is constructed as a crank handle. The medium movement handle and the fine movement handle are provided in positions apart from the rotating center of the crank handle.

In any aspect of the invention, a balancer (which is a balance weight) is preferably provided on the side opposite to the medium movement handle and/or the fine movement handle with respect to the rotating center of the crank handle.

According to the present invention, in any aspect of the invention, a knob is provided at a rotation central portion of the rough movement handle, and only the rough movement handle can be clamped in an arbitrary position.

In any aspect of the invention, the crank handle desirably has a speed reduction mechanism for transmitting the rotations of the fine movement handle and/or the medium movement handle to the output shaft.

According to the present invention, the handle apparatus comprises the rough movement handle and the fine movement handle for rotating the output shaft at leastwise such two stages as the rough movement and the fine movement by rotationally operating these handles. The rough movement handle is constructed as a crank handle. The fine movement handle is provided in the position apart from the rotating center of the crank handle. The handle apparatus includes a stopper for hindering at least one-directional rotations of the rotary output shaft, and a clutch for preventing the clutch handle from transmitting at least one-directional rotations to the rotary output shaft when the stopper hinders the rotations of the rotary output shaft.

The apparatus equipped with the medium movement handle preferably includes a torque adjustment mechanism for making variable a rotational torque of the medium movement handle.

Further, in any aspect of the invention, a preferable construction is such that a bearing mechanism supports the output shaft, the pinion is attached to one end of the output shaft, and the crank handle is fitted to the other end thereof.

According to the handle apparatus of the present invention, the rough movement is made by rotating the crank handle serving as the rough movement handle. The medium and fine movement are made by rotating the medium and fine movement handles, respectively. Accordingly, a large driving torque is transmitted to the output shaft during the rough movement. In the case of rotating the crank handle, the medium and fine movement handles may be operated while holding these handles in hand. Further, the balancer provided on the side opposite to the medium and fine movement handles with respect to the rotating center of the crank handle works to prevent the rotations of the crank handle that are caused by the self-weights of the medium and fine movement handles. Further, the medium and fine movement handles are provided in the positions apart from the rotating center of the crank handle constituting the rough movement handle. Hence, the operation of rotating the rough movement handle is different from the operation of the rotating the medium movement handle and the fine movement handle.

If the rotations of the crank handle are stopped in a proper position, the medium movement handle and the fine movement handle shift to arbitrary positions. Then, in the apparatus including the clamp mechanism of the crank handle, only the rough movement handle of the crank is clamped in that position. In the apparatus including the stopper for hindering at least one-directional rotations of the output shaft, even when the crank handle is rotated to change the positions of the medium movement handle and the fine movement handle, the output shaft never rotates in such a direction as to hinder the rotations of the output shaft.

According to the present invention, since the rough movement handle constructed in the form of the crank handle has a large rotational radius, a rotational moment is large, and a force required may be small enough for the rotational operation. Further, the medium movement handle and the fine movement handle are provided in the positions apart from the rotating center of the rough movement handle, and, therefore, the respective handles are easy to operate individually. Unlike the prior art, it seldom happens that other handles might be mistakenly operated together. Moreover, the medium movement handle and the fine movement handle can be shifted to the arbitrary positions, resulting in the good operability. On this occasion, in the apparatus having the stopper for hindering at least one-directional rotations of the output shaft, even when the crank handle is rotated to change the positions of the medium and fine movement handles, the output shaft never rotates in such a direction as to hinder the rotations of the output shaft, resulting in a much better operability.

The handle apparatus according to the present invention can be so unitized as to have a cantilever structure in which the torque can be controlled by itself. It is therefore possible to easily mount and demount the apparatus from the microscope, etc. Further, there may be a small number of parts and reduced the costs because of the cantilever structure.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
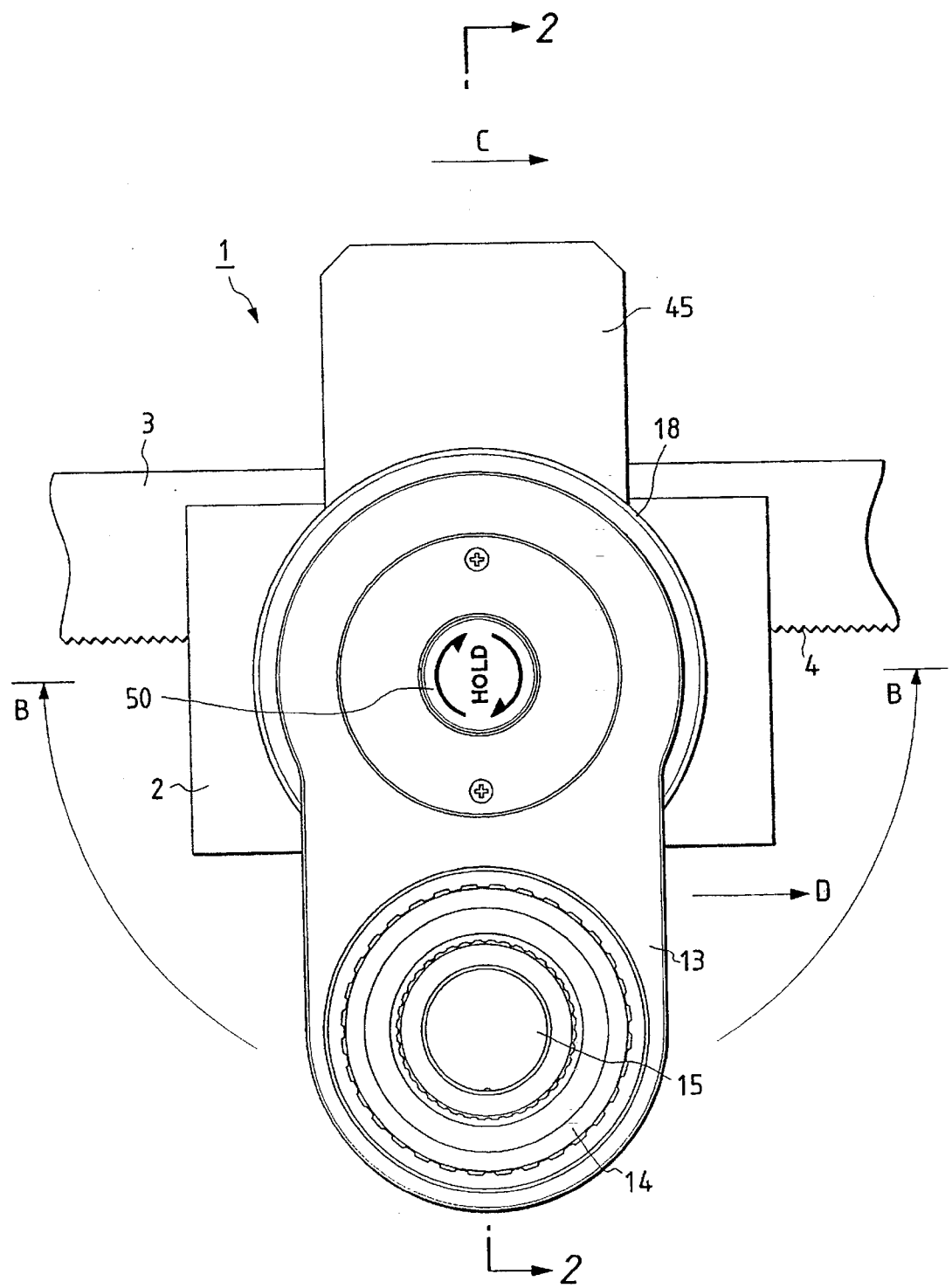
FIG. 1 is a side view showing a handle apparatus in a first embodiment of the present invention.
Figure 2:
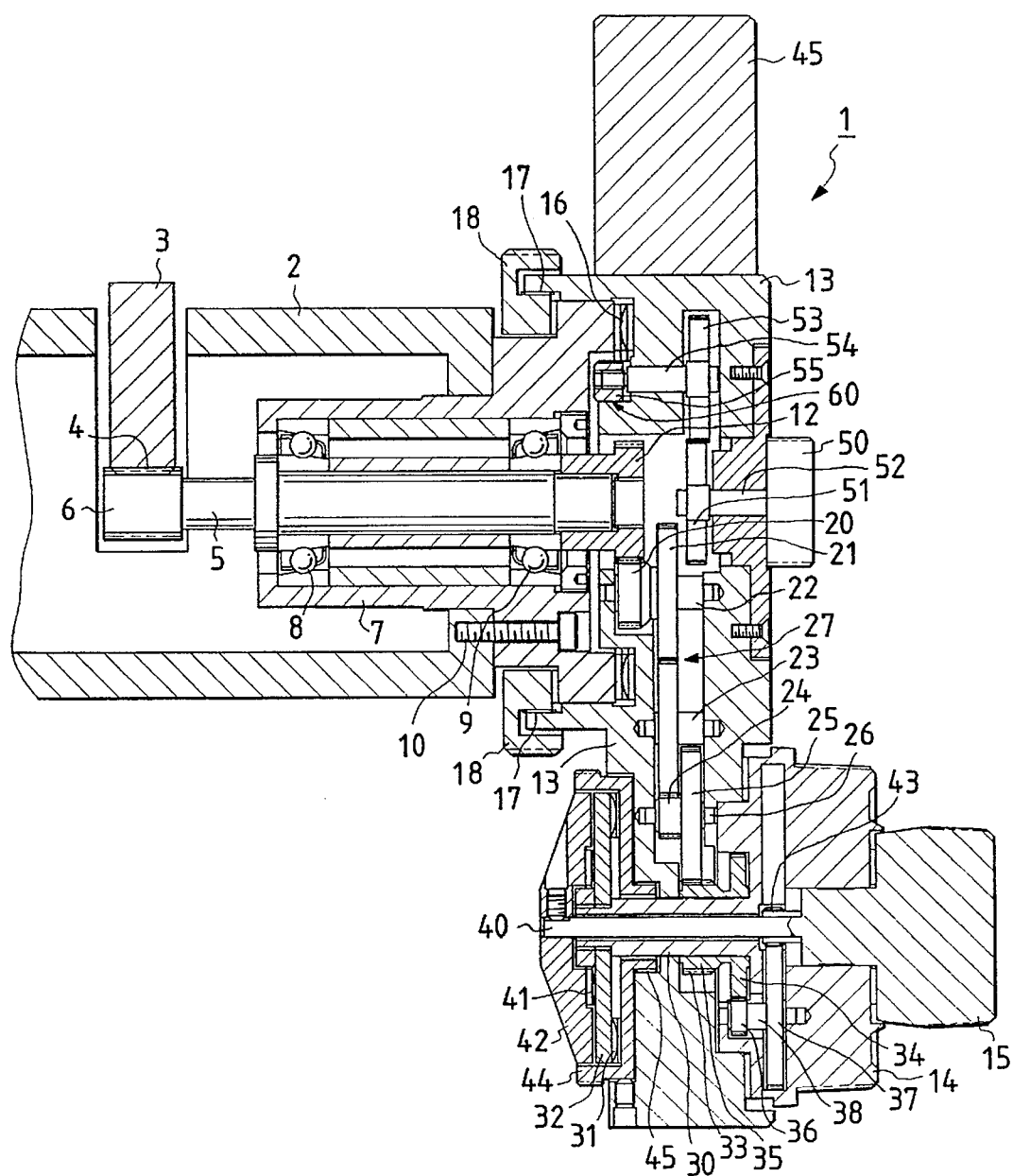
FIG. 2 is a sectional view taken substantially along the line 2—2 in FIG. 1.

There will hereinafter be discussed embodiments in which the present invention is applied to a handle apparatus for elevating and lowering an objective lens or a stage of a microscope. FIG. 1 is a side view illustrating a state where a handle apparatus 1 in a first embodiment of the present invention is mounted on a slider 2 of the microscope. FIG. 2 is a sectional view taken substantially along the line 2—2 of the apparatus shown in FIG. 1. A stage elevating/lowering mechanism is attained by attaching a stage to this slider 2, and an objective lens elevating/lowering mechanism is attained by attaching an objective lens thereto.

A support member 3 fixed substantially parallel to a guide (which is not shown) is inserted into an interior of the slider 2. A rack 4 is formed in the side surface of this support member 3. A pinion 6 fixedly fitted to one end (which is a left end in FIG. 2) of an output shaft 5 of the handle apparatus 1 engages with the rack 4. The slider 2 is elevated and lowered along the unillustrated guide by rotating the pinion 6, thus controlling a height of the stage or the objective lens.

The output shaft 5 is rotatably supported on bearings 8 and 9 provided into a casing 7. The casing 7 is fixed to the slider 2 with a plurality of bolts 10. The other end (which is a right end in FIG. 2) of the output shaft 5 that protrudes from the casing 7 is fixed with a gear 12. A rough movement handle 13 taking an arm-like shape is attached rotatably about the output shaft 5 so as to encompass the gear 12. A medium movement handle 14 and a fine movement handle 15 having a diameter smaller than that of the medium movement handle 14 are coaxially so provided as to be superposed at two stages in positions apart from a rotating center (corresponding to the output shaft 5) of the rough movement handle 13. Then, the casing 7, the rough movement handle 13, the medium movement handle 14 and the fine movement handle 15 are combined to constitute the handle apparatus 1 as a crank handle rotating about the output shaft 5 on the whole.

A wave washer 16 for imparting a frictional force intervenes in a thrust-directional contact portion between the casing 7 and the rough movement handle 13. A driving torque of the rough movement handle 13 can be controlled by slackening or strengthening a force acting to press the wave washer 16 between the casing 7 and the rough movement handle 13 while rotating a frictional force adjustment ring 18 fitted to the rough movement handle 13 through a screw member 17.

The rough movement handle 13 incorporates a speed reduction mechanism 27. The speed reduction mechanism 27 is constructed of a two-stage gear 22 having a small gear member 20 and a large gear member 21, an intermediate gear 23 serving as an idle gear, and a two-stage gear 26 including a small gear member 24 and a large gear member 25. The small gear member 20 of the two-stage gear 22 meshes with the gear 12 fixedly fitted to the output shaft 5. The intermediate gear 23 engages astride with both of the large gear member 21 of the two-stage gear 22 and the small gear member 24 of the two-stage gear 26.

The medium movement handle 14 is fixedly attached to one end (which is a right side in FIG. 2) of a cylindrical shaft 30. This cylindrical shaft 30 penetrates the rough movement handle 13 at a position apart from the rotating center thereof and protrudes on the side opposite to the medium movement handle 14 with the rough movement handle 13 being interposed therebetween. A disc 32 is fixedly fitted to an end portion (which is a left end in FIG. 2) of the cylindrical shaft 30 that protrudes from this rough movement handle 13. A frictional force adjustment ring 44 is spirally fitted through a screw portion 45 to the rough movement handle 13 on the side opposite to the medium movement handle 14 of the cylindrical shaft 30 penetrating the rough movement handle 13. The drive torque of the medium movement handle 14 is controlled by slackening or strengthening the force acting to press a wave washer 31 between the frictional force adjustment ring 44 and the disc 32 rotating together with the medium movement handle 14 by rotating the frictional force adjustment ring 44.

Further, a two-stage gear 35 including a small gear member 33 and a large gear member 34 is rotatably provided along the periphery of the cylindrical shaft 30. The small gear member 33 of the two-stage gear 35 engages with the large gear member 25 of the two-stage gear 26 of the above-mentioned speed reduction mechanism 27. Further, the interior of the medium movement handle 14 is provided with a rotatable two-stage gear 38 having a small gear member 36 and a large gear member 37 in a position apart from the cylindrical shaft 30. The small gear member 36 of the two-stage gear 38 meshes with the large gear member 34 of the two-stage gear 35 rotatably provided on the cylindrical shaft 30.

The fine movement handle 15 is fixedly attached to one end (which is a right end in FIG. 2) of a rotatable central shaft 40 penetrating the interiors of the cylindrical shaft 30 and of the medium movement handle 14. A frictional force adjustment ring 42 is fixedly fitted to the other end (which is a left end in FIG. 2) of the central shaft 40 that protrudes from the cylindrical shaft 30 on the side opposite to the fine movement handle 15 with the rough movement handle 13 being interposed therebetween. The frictional force adjustment ring 42 serves to press a wave washer 41 in the thrust direction with respect to the disc 32 of the medium movement handle 14. The fine movement handle 15 is sufficiently reduced in its speed by the above-mentioned gear mechanism and therefore has a small driving torque, and there is less possibility of adjusting the torque.

Further, a gear 43 is fixedly fitted to the central shaft 40. This gear 43 meshes with the large gear member 37 of the two-stage gear 38 provided in the interior of the medium movement handle 14 explained earlier.

Now, in the handle apparatus in accordance with this embodiment, when the rough movement handle 13 is rotated about the output shaft 5, the output shaft 5 rotates through the gear 12 without any rotation of the two-stage gear 22 provided inside the rough movement handle 13. More specifically, with the rotations of the rough movement handle 13, the two-stage gear 22 revolves in a position apart from the rotary shaft (which is the output shaft 5) of the rough movement handle 13. The gear meshing with the small gear member 20 of the two-stage gear 22 is thereby rotated to transmit the rotations to the output shaft 5. Note that a prevention of the rotations of the two-stage gear 22 provided in the interior of the rough movement handle 13 involves controlling the frictional force adjustment ring 44 and imparting a proper driving torque to the medium movement handle 14. Thus, the pinion similarly makes one rotation for one rotation of the rough movement handle 13 by rotating the rough movement handle 13, whereby the slider 2 can be elevated and lowered. With this operation, when the rough movement handle 13 makes, e.g., one rotation, the slider 2 can be elevated and lowered on the order of several tens millimeters.

On the occasion of rotating the rough movement handle 13, the medium movement handle 14 or the fine movement handle 15 may be operated while holding the handle in hand. If the rough movement handle 13 is thus rotated while holding the medium movement handle 14 or the fine movement handle 15 in hand that are provided in positions apart from the rotating center (corresponding to the output shaft 5), it is possible to transmit to the output shaft 5 a comparatively large driving torque because of the medium movement handle 14 or the fine movement handle 15 having a large rotational radius.

Further, the medium movement handle 14 or the fine movement handle 15 can be shifted to a desired position by stopping the rotation of the rough movement handle 13 in a proper position. In order to prevent the rotation of the rough movement handle 13 caused by the weight of the slider 2 after shifting the rough movement handle and releasing it, the frictional force adjustment ring 18 should be adjusted so as to impart the proper frictional force to the rough movement handle 13. Further, in order to prevent the rotation of the rough movement handle 13 caused by an offset load induced due to such a structure that the rough movement handle is provided with the medium movement handle 14 and the fine movement handle 15 at the positioned apart from the rotating center (corresponding to the output shaft 5) thereof, a balancer 45, for producing a moment enough to offset a moment caused by a weight of the medium movement handle 14 or the fine movement handle 15, is provided on the side opposite to the medium movement handle 14 and the fine movement handle 15 with respect to the rotating center (corresponding to the output shaft 5) of the rough movement handle 13.

Generally, easy-to-operate positions for the medium movement handle 14 and the fine movement handle 15 fall within a range of B—B in FIG. 1 in close proximity to an operator. Further, the slider 2 acts to lower at all times by a self-weight thereof. Note that the right direction shown in FIG. 1 corresponds to the lower side. Then, if the moment by the balancer 45 is set slightly larger than the moment by the medium movement handle or the fine movement handle, the rough movement handle 13 acts to rotate in an arrowed direction C shown in FIG. 1. However, a moment rotating in an arrowed direction D shown in FIG. 1 is always applied on the rough movement handle 13 by the weight of the slider 2. Hence, when the medium movement handle 14 or the fine movement handle 15 exists in the B—B range shown in FIG. 1, the moment by the balancer 45 and the moment by the weight of the slider 2 offset each other, with the result that the rough movement handle 13 is capable of stopping in an arbitrary position even if the frictional force adjustment ring 18 has a small frictional force. As a result, a small driving force may suffice for the rough movement handle 13.

The rough movement handle 13 is thus shifted to a desired position with a small force. Subsequently, when the medium movement handle 14 is rotated, the two-stage gear 35 is rotated while revolving in a position apart from the rotational shaft of the medium movement handle 14 together with the medium movement handle 14 without any rotation of the two-stage gear 38. The rotations of the two-stage gear 35 are transmitted to the output shaft 5 via the speed reduction mechanism 27 (consisting of the two-stage gear 22, the intermediate gear 23 and the two-stage gear 26) and the gear 12, and the pinion 6 is rotated, so that the slider 2 is elevated and lowered. With the above-described movement, if the medium movement handle 14 is rotated, e.g., once, the slider 2 is elevated or lowered by several millimeters. When the fine movement handle 15 is rotated, the rotation of the gear 43 is transmitted to the output shaft 5 via the two-stage gear 38, the two-stage gear 35, the speed reduction mechanism 27 (consisting of the two-stage gear 22, the intermediate gear 23 and the two-stage gear 26) and the gear 12, so that the pinion 6 is rotated so as to elevate or lower the slider 2. When the fine movement handle 15 is rotated, the two-stage gear 38 conducts only rotation. The slider 2 is elevated and lowered to an extent less than 1 mm for, e.g., one rotation of the fine movement handle 15.

Next, a clamp device of the rough movement handle 13 will be explained. A rotatable shaft 52 with the end fixedly fitted with a knob 50 and the other end fixedly fitted with a gear 51 is provided substantially coaxially with the rotating center of the rough movement handle 13. A rotatable shaft 54 with one end fixedly fitted with a gear 53 and the other end fixedly fitted with a male thread member is provided in a position apart from the rotating center (corresponding to the output shaft 5) of the rough movement handle 13. The gear 53 meshes with the gear 51. A rotatable member 55 is spirally fitted to the thread member of the shaft 54. The rotatable member 55 is restricted by a wall 60 from its rotation and therefore, when the shaft 54 rotates, moves in an axial direction of the shaft 54 along the spiral of the thread.

Based on such a construction, when the knob 50 is rotated in the right direction, the gear 51 rotates in the right direction, and the gear meshing therewith rotates in the left direction. The rotatable member 55 engaging with the thread of the shaft 54 moves in the axially left direction of the shaft 54 and contacts the casing 7. The screw is, however, formed as a right screw. As a result, the shaft 54 pushes both of the rough movement handle 13 and the casing 7 in the right and left directions, respectively. A frictional force produced during this period makes the rough movement handle 13 unable to rotate with respect to the casing 7. As a consequence, the rough movement handle 13 can not be clamped in an arbitrary position.

A height of the stage or the objective lens mounted on the slider 2 can be thus controlled by rotating the fine movement handle 15 or the medium movement handle located in the desired position. It is therefore feasible to easily finely control the height of the slider 2 while seeing through, e.g., an eyepiece, and a good operability can be obtained. For example, if the handle apparatus in this embodiment is applied to the mechanism for elevating and lowering the objective lens and the stage of the measuring microscope, the rough movement handle 13 is employed for elevating and lowering the slider 2 for making a rough positional adjustment and is therefore seldom operated while seeing through the eyepiece. The medium movement handle 14 and the fine movement handle 15 are, however, often operated while seeing the eyepiece to focalize. According to the handle apparatus in this embodiment, the medium movement handle 14 and the fine movement handle 15 can be shifted to a position close to the eyepiece by controlling an angle of the rough movement handle 13. Hence, the medium movement handle 14 and the fine movement handle 15 can be operated in the position proximal to the eyepiece. Note that rough movement handle 13 has a large rotational radius of the operating point if rotated while holding, e.g., the medium movement handle 14 in hand, and a required torque can be therefore obtained with a small force.

Further, in the handle apparatus 1 in this embodiment, the medium movement handle 14 and the fine movement handle 15 are provided in the positions apart from the rotating center (corresponding to the output shaft 5) of the crank handle constituting the rough movement handle 13. Accordingly, the operation of rotating the rough movement handle 13 is different from the operation of rotating the medium movement handle 14 and the fine movement handle 15, and there is caused no such problem that other handles mistakenly rotate together as seen in the prior art apparatus. Further, if the rough movement handle 13 having shifted to the arbitrary position is clamped, it never happens that the rough movement handle 13 moves during the operation of the medium movement handle 14 or the fine movement handle 15.

Then, according to the handle apparatus 1 in this embodiment, the whole handle apparatus 1 is unitized and can be therefore simply mounted to and demounted from the slider 2. Further, the handle apparatus 1 in this embodiment includes the bearing mechanism constructed of the bearings 8, 9 and the casing 7 for supporting the output shaft 5. The handle apparatus 1 is unitized with such a cantilever structure that the pinion 6 is attached to one end (which is the left end in FIG. 2) of the output shaft, while the rough movement handle 13 is attached to the other end (which is the right end in FIG. 2) and can be therefore mounted on the arbitrary side, whether right or left, of the slider 2. Moreover, because of the cantilever structure, the number of parts is smaller than in the prior art apparatus having the handles on both sides of the slider. Accordingly, it is possible to provide the inexpensive and easy-to-assemble handle apparatus.

Figure 3:
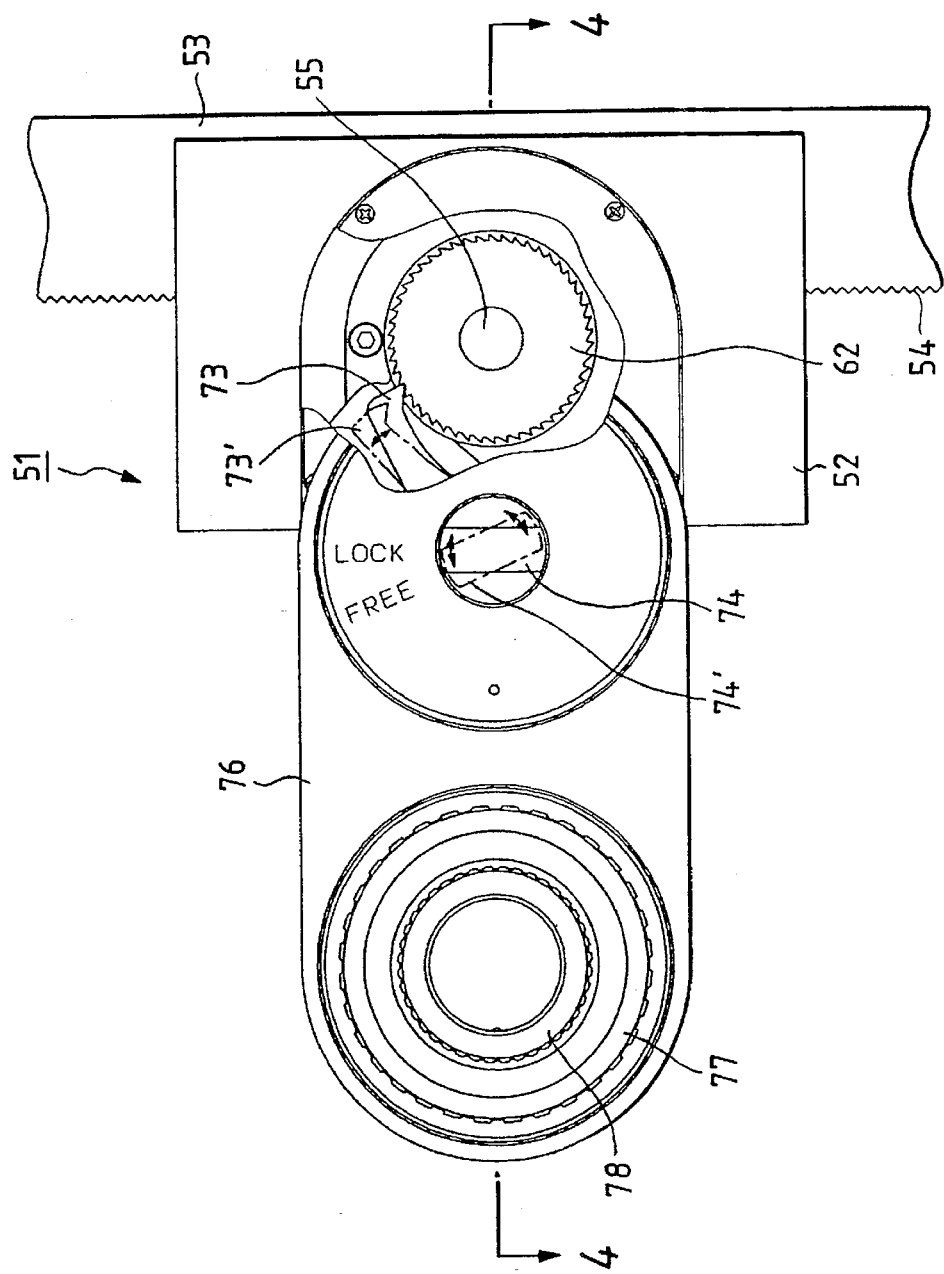
FIG. 3 is a side view illustrating the handle apparatus in another embodiment of the present invention.
Figure 4:
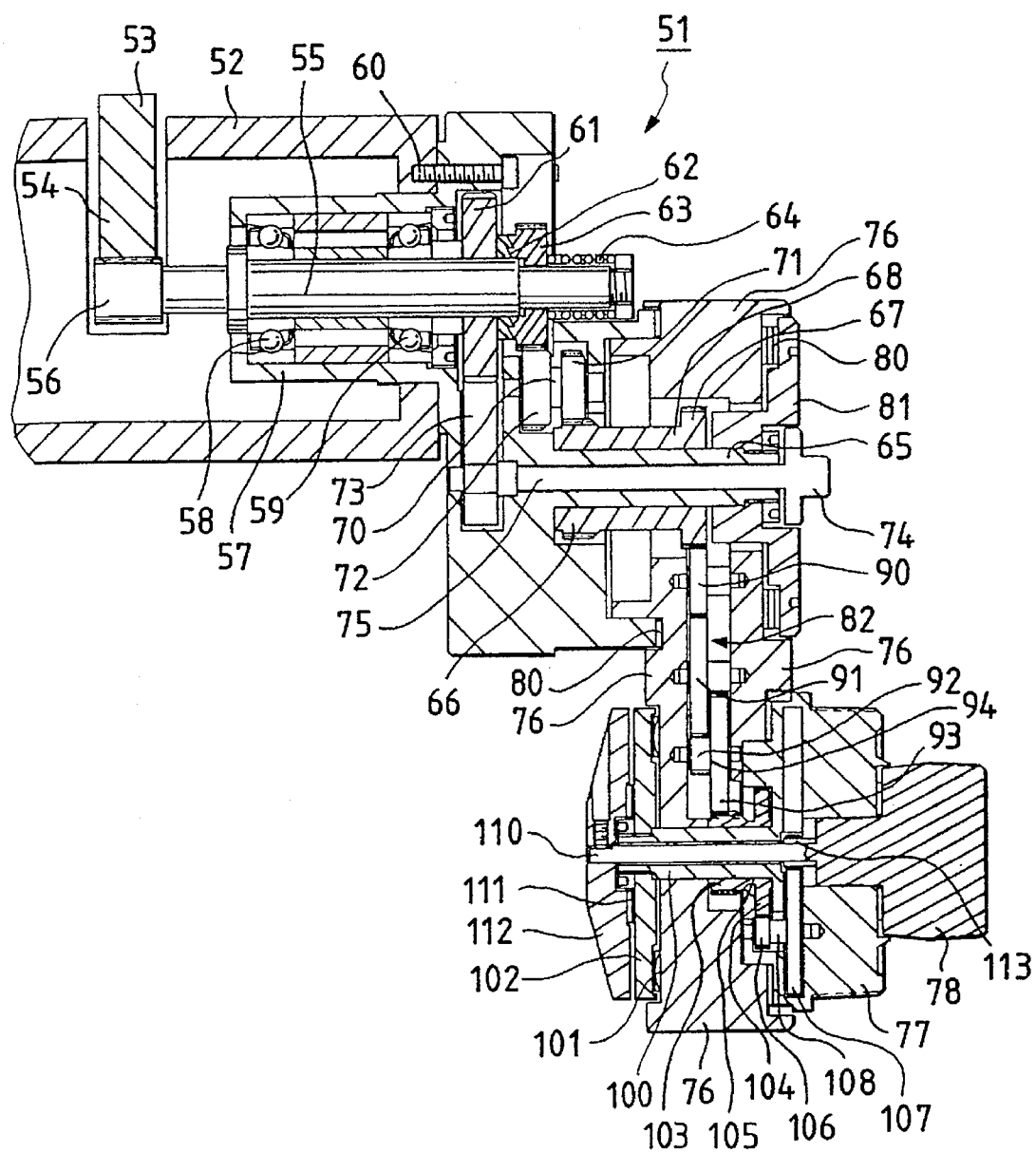
FIG. 4 is a sectional view taken substantially along the line 4—4 in FIG. 3.
Figure 5:
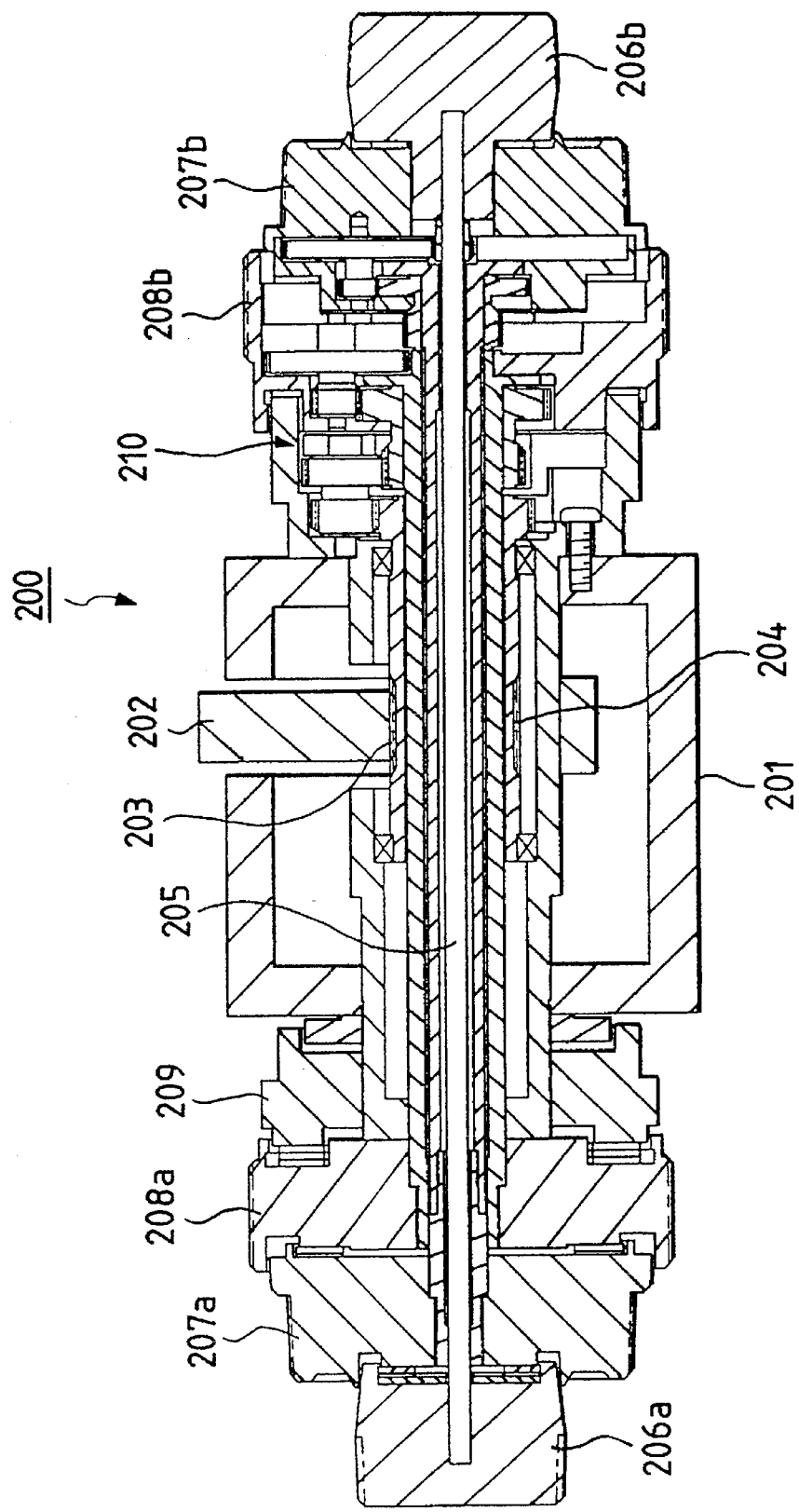
FIG. 5 is a sectional view illustrating a handle apparatus in the prior art.

FIG. 3 is a side view illustrating a state where a handle apparatus 51 in accordance with another embodiment of the present invention is mounted on a slider 52 of a microscope. FIG. 4 is a sectional arrow view, taken substantially along the line 4—4, of the apparatus shown in FIG. 3. The handle apparatus in this embodiment includes a switching mechanism for switching the system to a transmission state where the driving torque from each of the rough, medium and fine movement handles is transmitted to the output shaft and to a non-transmission state where no driving torque is transmitted thereto. If the stage is mounted on the slider 52, a stage elevating/lowering mechanism is attained. If the objective lens is mounted on the slider 52, an objective lens elevating/lowering mechanism is obtained.

As in the same way with the preceding embodiment, a rack 54 is formed in the side surface of a support member 53 inserted into the slider 51. A pinion 56 fixedly fitted to one end (which is a left end in FIG. 4) of an output shaft 55 of the handle apparatus 51 engages with the rack 54. The slider 52 is elevated and lowered with rotations of the pinion 56. The output shaft 55 is supported on bearings 58 and 59 provided within a casing 57. The casing 57 is fixed to the slider 52 with a plurality of bolts 60. The other end (which is a right end in FIG. 4) of the output shaft 5 that protrudes from the casing 57 is fixed with a ratchet wheel 61. A gear 63 is disposed on one side surface (which is a right side surface in FIG. 4) of this ratchet wheel 61 through a surface clutch 62. One side surface (which is a right end surface in FIG. 4) of the gear 63 is pressed by a coil spring 64. The ratchet wheel 61 and the gear 63 are adapted to be integrally rotated in a normal time by a pressing force of the coil spring 64.

A central shaft 65 is formed parallel to the output shaft 55 in a position away at a predetermined spacing. A two-stage gear 68 having a small gear member 66 and a large gear member 67 is rotatably formed along the periphery of this central shaft 65. The small gear member 66 of this two-stage gear 68 engages with a small gear member 71 of a two-stage gear 70 rotatably provided within the casing 57, while the large gear member 72 of the two-stage gear 70 meshes with the gear 63.

A drive shaft 75 of a lever 74 for operating a stopper 73 capable of engaging with the ratchet wheel 61 penetrates the interior of the central shaft 65. As illustrated in FIG. 3, when this lever 74 is rotated up to a lock position (which is indicated by a solid line 74 in FIG. 3), the stopper 73 is brought into a state where the stopper 73 engages with the ratchet wheel 61. Thus, when the stopper 73 engages with the ratchet wheel 61, the ratchet wheel 61 and the output shaft 55 are hindered from rotating in one direction (which is a counterclockwise rotating direction in FIG. 3). Further, when this lever 74 is rotated up to a free position (indicated by a one-dotted chain line 74' in FIG. 3), the stopper 73 is spaced away from the ratchet wheel 61. When the stopper is not thus engaged with the ratchet wheel 61, the ratchet wheel and the output shaft 55 are not hindered from rotating. Note that the stopper 73 is spaced away from the ratchet wheel 61 in the normal time by a biasing member (not shown), and the rachet wheel 61 and the output shaft 55 are not hindered from rotating.

A rough movement handle 76 taking an arm-like shape is attached rotatably about the output shaft 55 so as to encompass the two-stage pear 68 rotatably provided on the central shaft 65. As in the same way with the preceding embodiment described in FIGS. 1 and 2, a medium movement handle 77 and a fine movement handle 78 are coaxially so provided as to be superposed at two stages in positions apart from a rotating center (corresponding to the central shaft 65) of the rough movement handle 76.

Specific configurations of these rough, medium and fine movement handles 76, 77 and 78 are the same as those explained in the preceding embodiment discussed in FIGS. 1 and 2. That is, the rough movement handle 76, the medium movement handle 77 and the fine movement handle 78 are combined to constitute the handle apparatus 51 as a crank handle rotating about the central shaft 65 on the whole. A wave washer 80 for imparting the frictional force intervenes in a thrust-directional contact portion between the rough movement handle 76 and a frictional force adjustment ring 81. A driving torque of the rough movement handle 76 can be controlled by rotating this frictional force adjustment ring 81. The rough movement handle 76 incorporates a speed reduction mechanism 82. The speed reduction mechanism 82 is constructed of a gear 90, a gear 91 serving as an idle gear, and a two-stage gear 94 including a small gear member 92 and a large gear member 93. The gear 90 meshes with the large gear member 67 of the two-stage gear 68, while the gear 91 engages astride with the gear 90 and the small gear member 92 of the two-stage gear 94.

The medium movement handle 77 is fixedly attached to one end (which is a right end in FIG. 4) of a cylindrical shaft 100. This cylindrical shaft 100 penetrates a position apart from the rotating center of the rough movement handle 76. A frictional force adjustment ring 102 is fixedly fitted to the other end (which is a left end in FIG. 4) of the cylindrical shaft 100 that protrudes from the rough movement handle 76 on the side opposite to the medium movement handle 77 with the rough movement handle 76 being interposed therebetween. The frictional force adjustment ring 102 serves to press a wave washer 101 in the thrust direction with respect to the rough movement handle 76. The frictional force adjustment ring 102 and the medium movement handle 77 are relatively rotated, and the driving torque for the medium movement handle 77 is controlled by slackening or strengthening the force for pressing the wave washer 101 between the rough movement handle 76 and the frictional force adjustment ring 102.

Further, a two-stage gear 105 including a small gear member 103 and a large gear member 104 is rotatably provided along the periphery of the cylindrical shaft 100. The small gear member 103 of the two-stage gear 105 engages with the large gear member 93 of the two-stage gear 94 of the above-mentioned speed reduction mechanism 82. Further, the interior of the medium movement handle 77 is provided with a rotatable two-stage gear 108 having a small gear member 106 and a large gear member 107 in a position apart from the cylindrical shaft 100. The small gear member 106 of the two-stage gear 108 meshes with the large gear member 104 of the two-stage gear 105 attached to the cylindrical shaft 100.

The fine movement handle 78 is fixedly attached to one end (which is a right end in FIG. 4) of a rotatable central shaft 110 penetrating the interiors of the cylindrical shaft 100 and of the medium movement handle 77. A frictional force adjustment ring 112 is spirally fitted to the other end (which is a left end in FIG. 4) of the central shaft 110 that protrudes from the cylindrical shaft 100 on the side opposite to the fine movement handle 78 with the rough movement handle 76 being interposed therebetween. The frictional force adjustment ring 112 serves to press a wave washer 111 in the thrust direction with respect to the frictional force adjustment ring 102 of the medium movement handle 77. A driving torque of the fine movement handle 78 is controlled by slackening or strengthening a force acting to press the wave washer 111 between the frictional force adjustment ring 112 and the frictional force adjustment ring 102 of the medium movement handle 77 by shifting a fitting position of the frictional force adjustment ring 112 to the central shaft 110.

Further, a gear 113 is fixedly attached to the central shaft 110. This gear 113 meshes with a large gear member 107 of a two-stage gear 108 provided within the above-mentioned medium movement handle 77.

Now, according to the handle apparatus 51 in this embodiment, the output shaft 65 is rotated through the two-stage gear 68 and the two-stage gear 70 without any rotations of the gear 90 provided within the rough movement handle 76 by rotating the rough movement handle 76 about the central shaft 65. More specifically, the two-stage gear 68 meshing with the gear 90 is rotated by the gear 90 revolving in the position apart from the rotational shaft (corresponding to the output shaft 65) of the rough movement handle 76 with the rotations of the rough movement handle 76. Then, the two-stage gear 70 engaging with the small gear member 66 of the two-stage gear 68 is rotated, and the gear 63 meshing with the large gear member 72 of the two-stage gear 70 is also rotated, thus transmitting the rotations of the rough movement handle 76 to the output shaft 55. Incidentally, it is the same as the preceding embodiment described in FIGS. 1 and 2 that the prevention of the rotations of the gear 90 provided within the rough movement handle 76 involves controlling the frictional force adjustment rings 102 and 112 and imparting proper driving torques to the medium and fine movement handles 77 and 78. Thus, the slider 52 can be elevated and lowered for one rotation of the rough movement handle 76 by rotating the rough movement handle 76. With this operation, when the rough movement handle 76 makes, e.g., one rotation, the slider 52 can be elevated and lowered on the order of several tens millimeters. Incidentally, on the occasion of rotating the rough movement handle 76, the medium movement handle 77 and the fine movement handle 78 are operated while holding them in hand. A relatively large driving torque can be thereby transmitted to the output shaft 55 because of a large rotational radius of the operating point. This is also the same as the preceding embodiment described in FIGS. 1 and 2.

Further, when the medium movement handle 77 is rotated, the two-stage gear 105 is rotated while revolving in a position apart from the rotational shaft of the medium movement handle 77 together with the medium movement handle 77 without any rotation of the two-stage gear 108. The rotations of the two-stage gear 105 are transmitted to the two-stage gear 68 via the speed reduction mechanism 82 (consisting of the gear 90, the gear 91 and the gear 92). Then, the rotations of the medium movement handle 77 can be transmitted to the output shaft 55 via the two-stage gear 70 meshing with the small gear member 66 of the two-stage gear 68, and the gear 63 meshing with the large gear member 72 of the two-stage gear 70. With this operation, the slider 52 can be elevated and lowered on the order of several millimeters for, e.g., one rotation of the medium movement handle 77. Note that the driving torque of the medium movement handle 77 is controlled by rotating the frictional force adjustment ring 102. Further, the driving torque of the fine movement handle 78 can be transmitted to the two-stage gear 68 via the two-stage gear 108, the two-stage gear 105 and the speed reduction mechanism 82 (consisting of the gear 90, the gear 91 and the gear 92) by rotating the fine movement handle 78. The rotations of the fine movement handle 78 can be transmitted to the output shaft 55 via the two-stage gear 70 engaging with the small gear member 66 of the two-stage gear 68, and the gear 63 meshing with the large gear member 72 of the two-stage gear 70. Note that when rotating the fine movement handle 78, the two-stage gear 108 makes only the rotations. With this operation, the slider 52 can be elevated and lowered on the order of 1 mm or less for, e.g., one rotation of the fine movement handle 78. Note that the driving torque of the fine movement handle 78 is controlled by rotating the frictional force adjustment ring 112.

On the other hand, according to the handle apparatus 51 in this embodiment, when finishing the rough feed, and if the rough movement handle 76 stops in an undesirable position, i.e., in such a position that the medium and fine movement handles 77 and 78 are hard to operate, the lever 74 is rotated up to a lock position indicated by a solid line 74 shown in FIG. 3, and the stopper 73 engages with the ratchet wheel 61.

As a result, the ratchet wheel 61 and the output shaft 55 are put into a state where they are hindered from further rotating in the counterclockwise direction in FIG. 3.

In this state, when the rough movement handle 76 is rotated in such a direction as to hinder the output shaft 55 from rotating, i.e., in the counterclockwise direction shown in FIG. 3, both of the ratchet wheel 61 and the gear 63 start sliding upon disengaging from the surface clutch 62, whereby the rough movement handle 76 can be rotated while the output shaft 55 remains unrotated. Accordingly, the rough movement handle 76 can be shifted to a desired position without changing the position of the slider 52. The medium movement handle 14 and the fine movement handle 15 can be also shifted to the position in the close proximity to, e.g., the eyepiece, etc. Note that the mechanism in the embodiment hinders only the counterclockwise rotations of the output shaft 55 as shown in FIG. 3. Therefore, even when the lever 74 is in the lock position, and if the rough movement handle 76 is rotated counterclockwise in FIG. 3, the slider 52 can be elevated or lowered without hindering the rotations of the output shaft 55. Given hereinbelow is a specific explanation of an example where the handle apparatus 51 in this embodiment is applied to the mechanism for elevating and lowering the slider 52 of the microscope. In the case of such a construction as to control the lowering of the slider 52 in accordance with the engagement of, e.g., the stopper 73 with the ratchet wheel 61, the slider 52 is not lowered even by rotating the rough movement handle 76 in such a direction that the slider 52 is to be lowered when the level 74 is in the lock position, and the rough movement handle 76 can be shifted to a desired position without changing a height of the slider 52. At the same time, it is also possible to hinder the lowering of the slider 52 that is due to the self-weight thereof by making the stopper 73 and the ratchet wheel 61 engage with each other. However, even when the lever 74 is, as described above, in the lock position, and if the rough movement handle 76 is rotated in such a direction as to elevate the slider 52, the stopper 52 does not function, and the slider is elevated.

With this construction, even when the rough movement handle 76 is in an undesirable position when finishing the rough movement feed, the rough movement handle 76 can be rotated without changing the height of the slider 52, and the medium movement handle 77 and the fine movement handle 78 become easier to operate.

This invention being thus described, it will be obvious that the same may be varied in same ways. Such variations are not to be regarded as a departure from the spirit and scope of the invention, and all such medications as would be obvious to one skilled in the art are intended to be included within the scope of the following claims.

What is claimed is:

1. A handle apparatus comprising:
   a rotary output shaft;
   a crank handle which serves as a rough movement handle and rotating coaxially with said rotary output shaft; and
   a fine movement handle provided in a position apart from said rotary output shaft on said crank handle,
   wherein said rotary output shaft rotates with rotations of said crank handle and/or said fine movement handle.

2. The handle apparatus according to claim 1, further comprising:
   a balance weight for restricting rotations of said crank handle due to a weight of said fine movement handle on the side opposite to said fine movement handle with respect to a rotating center of said crank handle.

3. A handle apparatus comprising:

a rotary output shaft;

a crank handle which serves as a rough movement handle and rotating coaxially with said rotary output shaft; and medium and fine movement handles coaxially so provided as to be superposed in positions apart from said rotary output shaft on said crank handle, wherein said rotary output shaft rotates with rotations of said crank handle and/or said medium movement handle, and/or said fine movement handle.

4. The handle apparatus according to claim 3, further comprising:

a balance weight for restricting rotations of said crank handle due to weights of said medium movement handle and said fine movement handle on the side opposite to said medium movement handle and said fine movement handle with respect to a rotating center of said crank handle.

5. The handle apparatus according to claim 2, further comprising:

a clamp mechanism for fixing the rotations of said crank handle.

6. The handle apparatus according to claim 4, further comprising:

a clamp mechanism for fixing the rotations of said crank handle.

7. The handle apparatus according to claim 1, wherein said crank handle has a speed reduction mechanism which transmits the rotations of said fine movement handle to said rotary output shaft.

8. The handle apparatus according to claim 3, wherein said crank handle has a speed reduction mechanism which transmits the rotations of said medium movement handle and of said fine movement handle to said rotary output shaft.

9. The handle apparatus according to claim 1, further comprising:

a stopper for hindering at least one-directional rotations of said rotary output shaft; and a clutch for preventing said crank handle from transmitting at least one-directional rotations to said rotary output shaft when said stopper hinders the rotations of said rotary output shaft.

10. The handle apparatus according to claim 3, further comprising:

a stopper for hindering at least one-directional rotations of said rotary output shaft; and a clutch for preventing said crank handle from transmitting at least one-directional rotations to said rotary output shaft when said stopper hinders the rotations of said rotary output shaft.

11. The handle apparatus according to claim 3, wherein said medium movement handle has a torque adjustment mechanism.

12. The handle apparatus according to claim 1, further comprising:

a bearing mechanism for supporting said rotary output shaft; and a pinion provided at one end of said rotary output shaft, wherein said crank handle is provided at the other end of said rotary output shaft.

13. The handle apparatus according to claim 3, further comprising:

a bearing mechanism for supporting said rotary output shaft; and a pinion provided at one end of said rotary output shaft, wherein said crank handle is provided at the other end of said rotary output shaft.

* * * * *